May 29, 1928.
H. H. KEETON
WATER HEATER
Filed Oct. 15, 1926
1,671,676
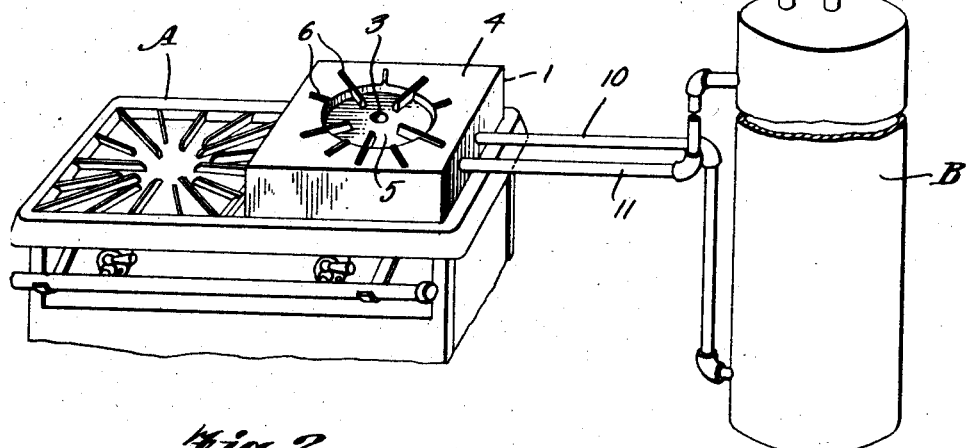
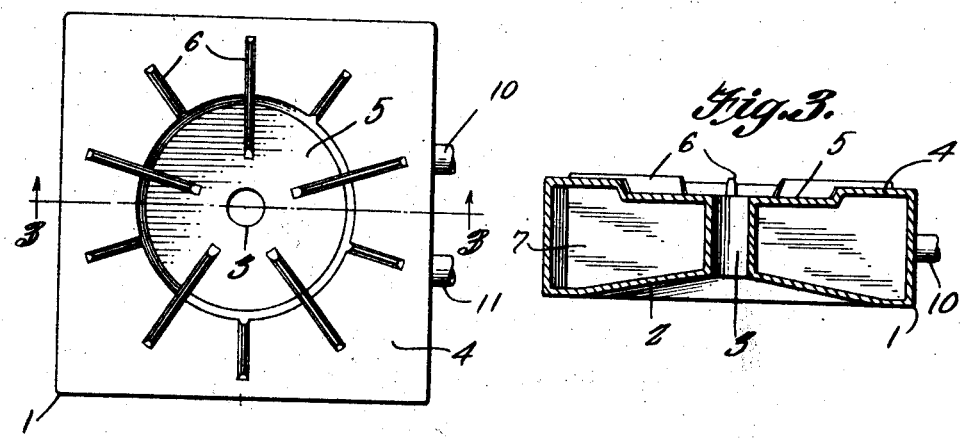
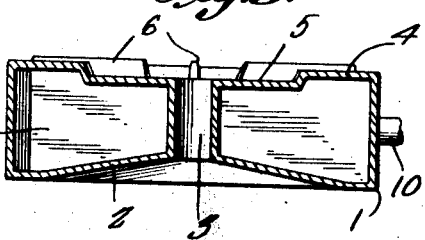
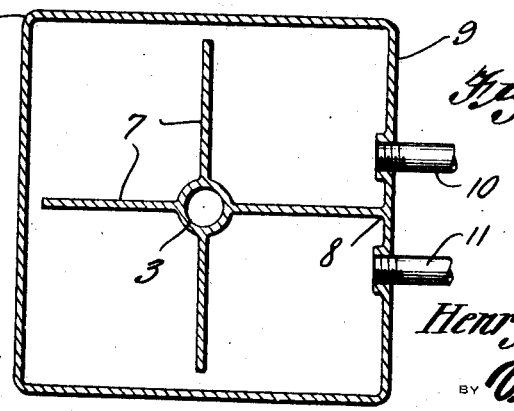
Henry H. Keeton,
INVENTOR
BY Victor J. Evans
ATTORNEY Patented May 29, 1928.

1,671,676

UNITED STATES PATENT OFFICE.

HENRY H. KEETON, OF RICHMOND, VIRGINIA.

WATER HEATER.

Application filed October 15, 1926. Serial No. 141,862.

This invention relates to water heaters adapted for use on stoves of various types and its primary object is to provide a water heater especially designed to replace the usual utensil supporting means or grid of a gas, gasoline, oil and electric stoves, but the heater can be used to advantage on other stoves, and said heater is designed to support a utensil in the same manner as the usual supporting means for cooking purposes as well as to quickly and efficiently heat the water in the heater.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:

Figure 1 is a perspective view of the water heater which forms the subject matter of the present invention applied to a gas stove and in communication with a tank.

Figure 2 is a top plan view of the heater per se.

Figure 3 is a sectional view taken on line 3—3 of Figure 2.

Figure 4 is a horizontal sectional view.

Referring to the drawings in detail the letter A indicates a gas stove of the usual construction and which includes the usual top for receiving the utensil supporting means and as shown in Figure 1 one of these means or grid is removed and my water heater replaces the same. While I have shown my heater associated with a gas stove, it will be obvious that the same can be positioned upon a gasoline, oil or electric stove to accomplish the same purpose and without departing from the spirit of the invention.

My heater includes a casing of a shape and size to snugly fit the depressions generally occupied by the grid, and overlies the burner of the stove as shown. This casing 1 is provided with a concave bottom 2 to deflect the flames or heat from the burner through an opening 3 formed through the center of the casing as clearly shown in Figure 3 to allow some of the heat for cooking purposes, and the top 4 of the casing is formed with a depression 5 within which extends some of a plurality of radiating fingers 6 which extend above the top for the purpose of supporting a utensil upon the heater.

Extending from the opposite sides of the wall which provides the opening 3 are partitions 7 one of which as indicated by the numeral 8 is formed integral with the side wall 9 of the casing while the others terminate in spaced relation with the front, back and other side wall. Arranged in the side wall 9 and upon opposite sides of the partition thereof is an inlet pipe 10 and an outlet pipe 11. These pipes are in communication with the casing in this manner so as to provide circulation of the water around the partitions spaced from the walls as will be readily apparent, and as shown in Figure 1, the outlet and inlet pipes communicate with the tank B in the usual manner whereby the water heated in the heater can be stored.

From the above description and disclosure in the drawings, it will be obvious that my heater not only is adapted for containing water to be heated from stoves of various types, but is also adapted for cooking purposes as the fingers 6 will support a pan or other utensil thereon so that the heat which escapes through the opening 3 will contact the pan or utensil and therefore be used for the mentioned purpose.

It is thought from the foregoing description that the advantages and novel features of my invention will be readily apparent.

I desire it to be understood that I may make changes in the construction and in the combination and arrangement of the several parts, provided that such changes fall within the scope of the appended claim.

It will be observed that the central opening, 3, is enclosed by and is in effect the interior of a vertical tube that extends between the central part of the bottom, which bottom is concavo-convexo, and the depressed central portion, 5, of the top, 4. The side walls of the opening, 3, thus afford vertically extended heating surfaces in contact with which the water heater comes, and it results in a construction in which the vertical dimensions of the water chamber are considerable, so that the heater has capacity for a large volume of water, which as it flows through the heater comes in contact with extended heating surfaces. Thus, my heater consisting of a single unit has capacity for a large volume of water, and a single unit is very advantageous because it requires the use of but one burner, which in the case of a plural burner stove leaves the other burners free for ordinary use.

It will be observed that the form of my heater is rectangular with the four side walls vertical from top to bottom; this form results in making the internal capacity of the heater the maximum compared with a form that is round or has rounded corners and at the same time it in no wise interferes with the use of the adjacent burners with the usual cooking utensils because the side of the latter can come close to or touch the plane sides of my heater.

What I claim is:—

A water heater adapted to be applied to the top of a stove of ordinary construction comprising a casing that is chambered, and includes side, bottom and top walls, and has a vertical internal wall that surrounds a central space that opens from top to bottom and through which heat from a burner below may pass and have contact with such wall, said vertical wall being of substantial extent and reaching from top to bottom of the casing within the chamber and presenting an extended vertical surface to water within the chamber, the bottom of the casing being concave and inclining upward to said central space, the top wall being depressed and extended horizontally from said vertical wall and the central space surrounded thereby, and partitions within the chamber between top and bottom, one of which extends to one of the side walls, said wall having on opposite sides of said last mentioned partition water inlet and water outlet openings.

In testimony whereof I affix my signature.

HENRY H. KEETON.